United States Patent
Busio et al.

(10) Patent No.: US 6,300,714 B1
(45) Date of Patent: Oct. 9, 2001

(54) DISPLAY PANEL

(75) Inventors: Johannes Maria Marcus Busio; Petrus Jacobus Maria Dohmen; Egbert Albertus Koopman, all of Eindhoven (NL)

(73) Assignee: U.S. Philips Electronics, New York, NY (US)

( * ) Notice: Subject to any disclaimer, the term of this patent is extended or adjusted under 35 U.S.C. 154(b) by 0 days.

(21) Appl. No.: 09/616,732

(22) Filed: Jul. 14, 2000

(30) Foreign Application Priority Data

Jul. 22, 1999 (EP) .................................................. 99202422

(51) Int. Cl.$^7$ .................................................. H01J 17/49
(52) U.S. Cl. .......................................... 313/582; 428/1.62
(58) Field of Search ........................... 428/1.62; 313/582, 313/584

(56) References Cited

U.S. PATENT DOCUMENTS 5,772,486   6/1998   Seki ........................................ 445/24

OTHER PUBLICATIONS

"A Rapic Method For Boron Determination In Glass By Means Of Inductively Coupled Plasma Emission Spectrometry (ICP–AES)" by J. Rebordinos Cuberto et al. in Bul. de la Sociedad Espagnola de Ceramica y Vidrio, pp. 552–559. (1992).

*Primary Examiner*—Alexander S. Thomas

(57) ABSTRACT

The display panel has a glass backplate (1) a first surface of which is provided with barrier ribs (3) of glass frit. Electrodes (5) are present between the ribs (3). A front member (10) rests on the barrier ribs (3) and is sealed to the backplate (1). The front member (10) has electrodes (11) which extend transversely to the ribs (3). The glass frit of the ribs (3) mainly consists of ZnO, $B_2O_3$ and $V_2O_5$ and has a minor content of $SiO_2$, PbO and/or CuO, and BaO and are mechanically strong. The glass frit combines a relatively small thermal coefficient of expansion and a relatively low sintering temperature, which makes the frit particularly suitable for use with a backplate (1) of borate glass, particularly an alkali-free borosilicate glass.

3 Claims, 1 Drawing Sheet

DISPLAY PANEL

The invention relates to a display panel comprising:

a glass backplate having a thermal coefficient of expansion of between $2.8*10^{-6}$ and $10*10^{-6}K^{-1}$, a first surface of which is provided with ribs of sintered glass frit, which ribs have a substantially parallel direction and bound channels, said backplate having electrodes extending in the direction of the ribs;

a plate-shaped front member comprising glass having a thermal coefficient of expansion of between $2.8*10^{-6}$ and $10*10^{-6}K^{-1}$ and provided with light-transmissive electrodes which extend transversely to the channels, said front member resting on the ribs and being connected to the backplate in a gastight manner;

an ionizable gas in the channels.

A display panel of this type is known from U.S. Pat. No. 5,772,486.

The known display panel is a plasma-addressed display panel. The plate-shaped front member has a cavity between its electrodes and the backplate, which cavity is filled with an electro-optical material such as, for example, liquid crystals. When a gas discharge is generated in one or more of the channels because the relevant electrodes of the backplate are energized, and when a voltage is applied to one or more electrodes of the plate-shaped front member, the electro-optical material assumes a different orientation at the area where these electrodes cross the gas discharge. An image or alphanumerical information thereby becomes visible on the display panel. The visibility may be improved by passing light through the display panel.

When manufacturing the display panel, the ribs must be given the same substantially equal height throughout so as to achieve that the channels are separated from each other. To this end, the backplate with the sintered ribs is subjected to a grinding operation. The ribs must have a sufficient mechanical strength to prevent parts of its from breaking off during grinding.

In addition to mechanical strength, the thermal coefficient of expansion of the ribs is important. This expansion coefficient should correspond to that of the glass on which the ribs have been provided so as to prevent that the ribs come loose or that the panel gets warped. It is also important that the glass frit of the ribs can be sintered at a relatively low temperature because the backplate will otherwise lose its shape during sintering. In the manufacture of the known display panel, the sintering operation is carried out at a relatively high temperature: 540–600° C. (7:32). As the glass frit has a lower coefficient of expansion, the sintering temperature will, however, be generally higher because materials having a small coefficient of expansion, such as for example $SiO_2$, have a high sintering temperature. A small coefficient of expansion and a low sintering temperature thus do not generally go together. On the other hand, the ribs should not flow too much but maintain their shape at temperatures of approximately 450° C. at which the backplate is connected in a gastight manner to the front member by means of, for example bonding glass.

In the known display panel, a commercially available glass frit paste is used to form the ribs therefrom (9:17–19). The above-cited U.S. Pat. No. 5,772,486 only states about the composition that it comprises glass grains, a resin binder, a solvent and other additions (6:10–12) and that a glass paste which is mixed with a ceramic material such as aluminum oxide is used (2:55–58). A glass frit having a coefficient of expansion which is too large in itself may be used because constituents have been added which have a smaller coefficient of expansion and thus render the coefficient of expansion of the total mixture relatively small. A considerable drawback of additions is, however, that they decrease the mechanical strength of the ribs and increase the risk of parts of the ribs breaking off during the grinding operation.

It is also important for the ribs that they do not transmit much light so as to achieve that light travels through the display panel substantially transversely to the display panel. To this end, pigments are often used as extra additions, which, however, also has a detrimental influence on the mechanical strength of the ribs.

Upon analysis of a number of commercial glass frits with Inductively Coupled Plasma Emission Spectrometry (ICP-AES) as known from Bul. de la Sociedad Espagnola de Ceramica y Vidrio, 553–558 (1992), the compositions given in Table 1 were found.

TABLE 1

| Error! Bookmark not defined. | SB5 | NP7977M | BR3SB |
|---|---|---|---|
| color | dark grey | black | light grey |
| additive | $PbTiO_3$ | 0.9 $Al_2O_3$; 1.5 $SiO_2$; 1.0 $Li_2O$ | $Pb_{0.75}Ca_{0.25}TiO_3$ |
| wt % | 70 | 37 | 40 |
| pigment | $CuCr_2O_4$ | $CuCr_2O_4/Fe_3O_4$ | $Fe_3O_4$ |
| wt % | 9 | 8 | 2 |
| glass | 0.7 $Al_2O_3$; 19 $B_2O_3$; 65.1 PbO; 3.8 ZnO; 11.4 $SiO_2$ | 43 ZnO; 32 PbO; 25 $B_2O_3$ | 0.5 $Al_2O_3$; 24 $SiO_2$; 75.5 PbO; 12.6 ZnO; 9.1 $B_2O_3$ |
| α | $6.7 * 10^{-6}K^{-1}$ | $>>7.5 * 10^{-6}K^{-1}$ | $9.5 * 10^{-6} K^{-1}$ |
| wt % | 21 | 55 | 58 |

It appears from this Table that the glass constitutes a small to very small part of the entire composition, that it has a relatively large coefficient of expansion and that it comprises a large to very large quantity of lead oxide. Pigment gives color to the glass frit. The pigment and the additives give the glass frit its coefficient of expansion and, also due to their large quantities, cause a mechanical weakness of ribs made of the frit. The high lead contents of these glass frits are also a drawback.

It is an object of the invention to provide a display panel of the type described in the opening paragraph, which display panel has ribs of glass frit having a high mechanical strength, a small lead content and a relatively low sintering temperature.

According to the invention, this object is achieved in that the glass frit comprises 90 to 97.5% by weight of ZnO, $B_2O_3$ and $V_2O_5$, in which the mutual weight ratios of these components are between the points A, B, C and D of their ternary phase diagram, which points have the following compositions: A:44;36;20, B:59.6;20.4;20, C:63.3;31.7;5 and D:50.7;44.3;5 (% by weight of ZnO; % by weight of $B_2O_3$; % by weight of $V_2O_5$), 1.6 to 7% by weight of oxides chosen from CuO, PbO, and CuO plus PbO, 0.2 to 1.2% by weight of $SiO_2$ and 0.5 to 2.5% by weight of BaO.

In the glass frit of the ribs, additives and pigments are avoided so that the ribs have a great mechanical strength and the risk of breaking of portions from the ribs is effectively counteracted. Yet, the ribs are colored so that they are little transmissive or non-transmissive, with the color being dependent on the circumstances during their realization, for example, a treatment after sintering in a reducing environment such as, for example, $H_2/N_2$. Furthermore, the ribs have an extremely low lead content. The frit of the ribs surprisingly has a relatively low sintering temperature of approximately 525–550° C. and nevertheless a small thermal coefficient of expansion of approximately $4.5*10^{-10}K^{-1}$. Due to the surprisingly favorable combination of a relatively small expansion coefficient and a relatively low sintering temperature, the display panel can be made in an easy and reliable way because it is not necessary to heat it to a high temperature, which effectively counteracts the risk of deformation of the backplate.

The glass frit comprises 90 to 97.5% by weight of ZnO, $B_2O_3$ and $V_2O_5$ because the expansion coefficient is too large at a quantity which is smaller than 90% by weight and the other components have too little influence at a quantity which is higher than 97.5% by weight.

The quantity of $V_2O_5$ is between 5 and 20% by weight, because the sintering temperature of the glass is too high at quantities of less than 5% by weight and the expansion coefficient is too large at large quantities.

The quantities of ZnO and $B_2O_3$ are between the values given by the points A, B, C and D of the ternary phase diagram of said three components, because the components do not form a stable glass outside the range indicated by these points.

Apart from contaminations, the glass frit comprises, essentially up to 100% by weight, 1.6 to 7% by weight of PbO, CuO, or PbO plus CuO, because the frit has a too high viscosity at less than 1.6% by weight of PbO, CuO or PbO plus CuO and its coefficient of expansion is too large at more than 7% by weight; 0.2 to 1.2% by weight of $SiO_2$, because the glass crystallizes too slowly at less than 0.2% by weight of $SiO_2$ and the sintering temperature is too high at more than 1.2% by weight; and 0.5 to 2.5% by weight of BaO, because the glass frit has an insufficient adhesion at less than 0.5% by weight of BaO and because there is a risk of demixing at more than 2.5% by weight.

The composition of the ribs of a finished display panel can be determined by means of ICP-AES.

It has been found that in a plasma-addressed display panel with liquid crystals as an electro-optical material, alkali metals may get into the liquid crystals due to diffusion from gas and may lead to degradation of these crystals. It is therefore favorable to use alkali-free glass in the display panel, for example, alkali-free borosilicate glass instead of alkali-containing borate glass. Such glasses are commercially available. For ease of manufacture of the display panel, it is advantageous when the backplate is also made of alkali-free borosilicate glass. Such alkali-free borosilicate glasses generally have a thermal coefficient of expansion of between approximately $3.5*10^{-6}K^{-1}$ and approximately $4.5*10^{-6}K^{-1}$.

The display panel according to the invention may be a plasma display panel in which, for example, such a borosilicate glass is used in the plate-shaped front member and possibly in the backplate. The channels in such a panel usually contain an electroluminescent material which emits light under the influence of a gas discharge in the channel.

The channels of the backplate may be made, for example, by coating the backplate on one surface with a paste of glass frit and, after drying, by providing grooves in the frit layer by means of powder blasting. Since the glass frit has a very low lead content or is even free from lead, this method is readily applicable for environmental reasons. It is, however, favorable to provide the ribs by printing the backplate in one or more steps with a paste of the glass frit. Prior to a subsequent step, a layer which has been provided can be dried at, for example, 120° C. The ribs can be sintered in air, for example, at 550° C. The ribs are strong, have a yellow-green color and adhere satisfactorily to the backplate. After treatment in, for example, $H_2/N_2$, they assume a darker color.

The glass frit may be obtained by mixing weighted quantities of the components and by melting the mixture.

EXAMPLE:

For example, expressed in % by weight, ZnO: 60, $B_2O_3$: 24, dosed as $H_3BO_3$, $V_2O_5$: 10, $SiO_2$: 0.5, PbO: 1.5, CuO: 2.5 and BaO: 1.5, dosed as $BaCO_3$ may be used. The mixture can be melted at approximately 1100° C. The melt can be cooled in water when it has become homogeneous. The glass is subsequently ground, for example, first in a dry state and then in a wet state in, for example, isopropanol. The glass powder is then sieved, for example, through a sieve having 10 $\mu m$ meshes and dried. To obtain a paste, the powder is taken up in a binder solution, for example, in 50% by weight of a solution of, for example, 5% by weight of ethyl cellulose in terpineol.

Upon ICP-AES analysis of ribs made by means of this frit, the following composition was found: ZnO: 60.5, $B_2O_3$: 24.0, $V_2O_5$: 9.5, CuO: 2.35, PbO: 1.42, BaO: 1.43, $SiO_2$: 0.80 (% by weight).

These and other aspects of the invention are apparent from and will be elucidated with reference to the embodiments described hereinafter.

Figure 1:
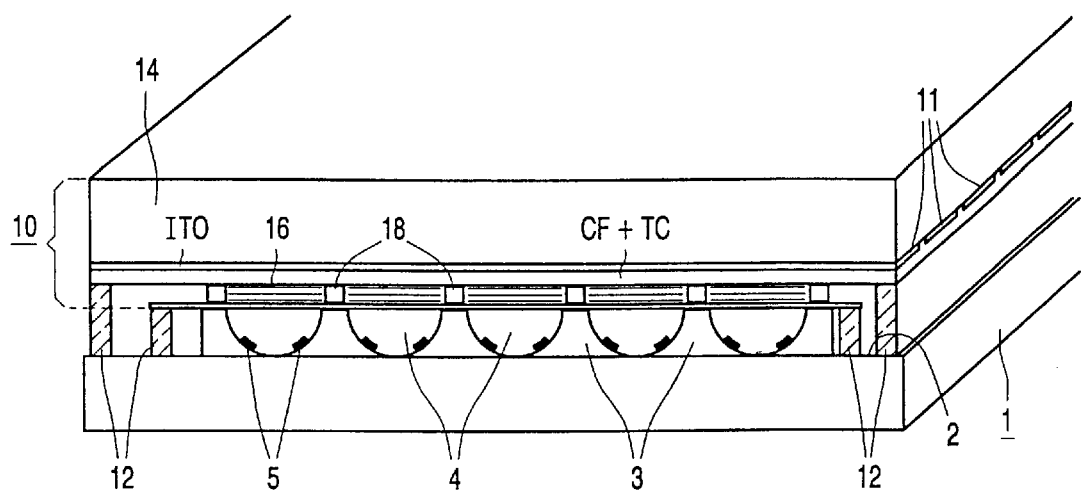
FIG. 1 is a diagrammatic perspective view of a display panel in a cross-section.

In FIG. 1, the display panel has a glass backplate 1 with a thermal coefficient of expansion of between $2.8*10^{-6}$ and $10*10^{-6}K^{-1}$, a first surface 2 of which is provided with ribs 3 of sintered glass frit having a mainly parallel direction and bounding channels 4. The backplate has electrodes 5 of, for example, aluminum extending in the direction of the ribs 3. A plate-shaped front member 10 is present, which comprises glass having a thermal coefficient of expansion of $2.8*10^{-6}$ and $10*10^{-6}K^{-1}$ and is provided with light-transmissive electrodes 11 which extend transversely to the channels 4. The front member 10 rests on the ribs and is connected to the backplate in a gastight manner by means of a melt glass 12 in the Figure. An ionizable gas is present in the channels.

The ribs 3 have the composition described in the previous example and are obtained from the frit paste described in this example. They have a thermal coefficient of expansion of $4.5*10^{-6}K^{-1}$.

The Figure shows a plasma-addressed liquid crystal display panel. The front member 10 comprises a glass plate 14 on which the electrodes 11 are provided by means of, for example tin oxide-doped indium, a dielectric foil 15 and spacers 18. Together with the dielectric foil 15 and the spacers 18, the glass plate 14 bounds a space in which liquid crystal material 16 is provided. A potential, for example, ground potential may be applied to an electrode 5 in each channel, while another voltage may be applied to another electrode 5, causing a discharge in the relevant channel 4.

When a crossing electrode 11 is energized, a pixel is produced at the area of the crossing. In the embodiment shown, the plate-shaped front member 10 is composed of a glass plate 14 of alkali-free borosilicate glass. In the embodiment shown, the backplate 1 is also made of alkali-free borosilicate glass, for example, the commercially available AF45 of the firm of Schott, having a coefficient of expansion of $4.5*10^{-6}K^{-1}$ and the following composition: $SiO_2$ 50.7; BaO 24.0; $Al_2O_3$ 13.5; $B_2O_3$ 10.8 and $As_2O_3$ 1.0. The glass plate 14 of this material. Instead, however, it is possible to use, for example, Corning1737 having a thermal coefficient of expansion of $3.7*10^{-6}K^{-1}$ and the composition $SiO_2$ 56.9; $B_2O_3$ 8.5; BaO 10; $Al_2O_3$ 16.4; SrO 1.9; CaO 4.45; MgO 0.75 and $As_2O_3$ 1.1.

Figure 2:
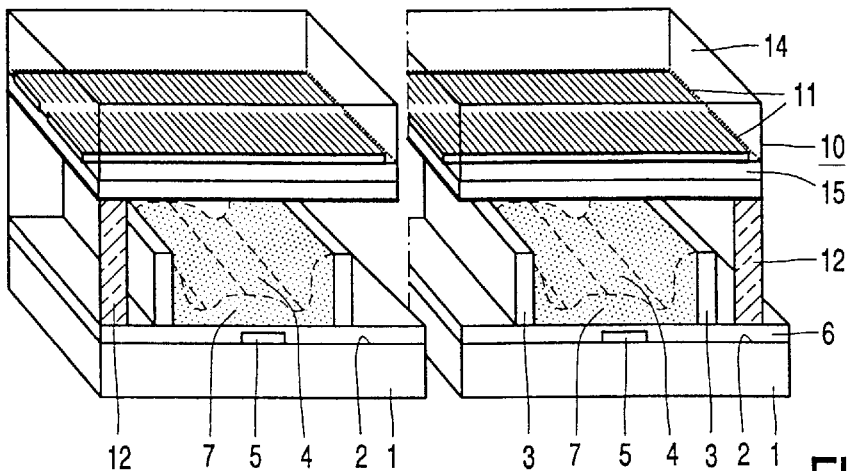
FIG. 2 is a diagrammatic perspective view, broken away, of another display panel.
Figure 3:
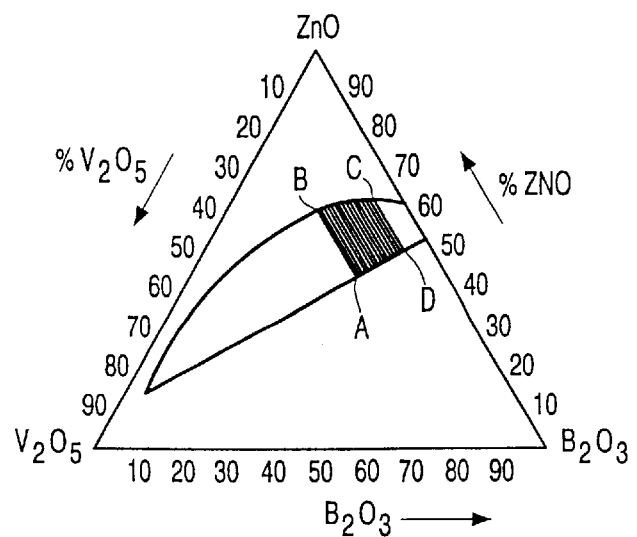
FIG. 3 shows the ternary phase diagram of ZnO, $B_2O_3$ and $V_2O_5$.

In FIG. 2, corresponding components of the plasma display panel shown are denoted by the same reference numerals as in FIG. 1. Here, the electrodes 5 are incorporated in a dielectric glass layer 6 supporting the ribs 3. Adjacent channels 4 have a coating of red, green and blue electroluminescent material 7. When a discharge is generated in the channels between the relevant electrode 5 and a crossing electrode 11, the electroluminescent material 7 generates light at the area of the crossing.

What is claimed is:

1. A display panel comprising:

a glass backplate (1) having a thermal coefficient of expansion of between $2.8*10^{-6}$ and $10*10^{-6}K^{-1}$, a first surface (2) of which is provided with ribs (3) of sintered glass frit, which ribs have a substantially parallel direction and bound channels (4), said backplate (1) having electrodes (5) extending in the direction of the ribs (3);

a plate-shaped front member (10) comprising glass having a thermal coefficient of expansion of between $2.8*10^{-6}$ and $10*10^{-6}K^{-1}$ and provided with light-transmissive electrodes (11) which extend transversely to the channels (4), said front member (10) resting on the ribs (3) and being connected to the backplate (1) in a gastight manner;

an ionizable gas in the channels (4), characterized in that the glass frit comprises 90 to 97.5% by weight of ZnO, $B_2O_3$ and $V_2O_5$, in which the mutual weight ratios of these components are between the points A, B, C and D of their ternary phase diagram, which points have the following compositions A:44;36;20, B:59.6;20.4;20, C:63.3;31.7;5 and D:50.7;44.3;5 (% by weight of ZnO; % by weight of $B_2O_3$; % by weight of $V_2O_5$), 1.6 to 7% by weight of oxides chosen from CuO, PbO, and CuO plus PbO, 0.2 to 1.2% by weight of $SiO_2$, and 0.5 to 2.5% by weight of BaO.

2. A display panel as claimed in claim 1, characterized in that at least the plate-shaped front member (10) is composed of alkali-free borosilicate glass.

3. A display panel as claimed in claim 2, characterized in that the backplate (1) is made of alkali-free borosilicate glass.

* * * * *